US012775113B2

(12) United States Patent
Zheng et al.

(10) Patent No.: US 12,775,113 B2
(45) Date of Patent: Oct. 27, 2026

(54) FAULT CONTROL BEAM TOMOGRAPHY REGULARIZATION METHOD AND APPARATUS, COMPUTER DEVICE, AND STORAGE MEDIUM

(71) Applicants: CHINA PETROLEUM & CHEMICAL CORPORATION, Beijing (CN); SINOPEC GEOPHYSICAL RESEARCH INSTITUTE, Nanjing (CN)

(72) Inventors: Hao Zheng, Nanjing (CN); Kai Guo, Nanjing (CN); Junchen Liu, Nanjing (CN)

(73) Assignees: CHINA PETROLEUM & CHEMICAL CORPORATION, Beijing (CN); SINOPEC GEOPHYSICAL RESEARCH INSTITUTE, Nanjing (CN)

( * ) Notice: Subject to any disclaimer, the term of this patent is extended or adjusted under 35 U.S.C. 154(b) by 272 days.

(21) Appl. No.: 18/568,556

(22) PCT Filed: Oct. 26, 2022

(86) PCT No.: PCT/CN2022/127620
§ 371 (c)(1),
(2) Date: Dec. 8, 2023

(87) PCT Pub. No.: WO2023/072132
PCT Pub. Date: May 4, 2023

(65) Prior Publication Data

US 2024/0295667 A1 Sep. 5, 2024

(30) Foreign Application Priority Data

Oct. 26, 2021 (CN) ........................ 202111248097.4

(51) Int. Cl.
*G01V 1/36* (2006.01)
*G01V 1/30* (2006.01)
(Continued)

(52) U.S. Cl.
CPC .............. *G01V 1/362* (2013.01); *G01V 1/303* (2013.01); *G06T 7/20* (2013.01); *G06T 12/10* (2026.01);
(Continued)

(58) Field of Classification Search
CPC .......... G01V 1/282; G01V 1/30; G01V 1/303; G01V 1/362; G01V 2210/614;
(Continued)

(56) References Cited

U.S. PATENT DOCUMENTS 9,869,783 B2 1/2018 Jin et al.
2006/0074610 A1* 4/2006 Rasmussen ............. G06T 13/60 703/2
2013/0258810 A1 10/2013 Hu

FOREIGN PATENT DOCUMENTS

CN 103514630 B 2/2017
CN 106597533 A 4/2017
CN 112285771 A 1/2021

OTHER PUBLICATIONS

Libak, Audun et al., "Fault visualization and identification in fault seismic attribute volumes: Implications for fault geometric characterization", Interpretation, May 2017, vol. 5, No. 2, pp. 1-16.
(Continued)

*Primary Examiner* — Zhiyu Lu
(74) *Attorney, Agent, or Firm* — NKL Law; Allen Xue

(57) ABSTRACT

A fault control beam tomography regularization method and apparatus, a computer, and a storage medium are provided. The method includes: acquiring a seismic imaging data volume; extracting a coherence attribute from the seismic
(Continued)

imaging data volume; resampling data of the coherence attribute to obtain a resampling coherence attribute corresponding to a tomography grid; obtaining an input ray density by ray tracing; calculating a fault control beam tomography operator according to the resampling coherence attribute and the input ray density; and introducing the fault control beam tomography operator to a tomography inversion target function for regularization constraint, to obtain a tomography inversion target function into which the regularization constraint has been added.

9 Claims, 6 Drawing Sheets

(51) Int. Cl.
*G06T 7/20* (2017.01)
*G06T 12/10* (2026.01)
*G06T 12/20* (2026.01)

(52) U.S. Cl.
CPC .... *G06T 12/20* (2026.01); *G06T 2207/10072* (2013.01); *G06T 2207/30181* (2013.01)

(58) Field of Classification Search
CPC ....... G01V 2210/642; G01V 2210/646; G01V 2210/671; G06N 3/00; G06T 12/10; G06T 12/20; G06T 2207/10072; G06T 2207/30181; G06T 7/20; G16H 20/40; G16H 30/40
See application file for complete search history.

(56) References Cited

OTHER PUBLICATIONS

Baillard, Christian et al., "A Joint Inversion for Three-dimensional P and S Wave Velocity Structure and Earthquake Locations Beneath Axial Seamount", Journal of Geophysical Research: Solid Earth, Nov. 21, 2019, vol. 124, No. 12, pp. 12997-13020.
Huang, Guang-Nan et al., "Variable damping constraint tomography and its application in VSP Data", Applied Geophysics, vol. 9, No. 2, Jul. 20, 2012, pp. 177-185.
Civiero, Chiara et al., "The Seismic Signature of Upper-Mantle Plumes: Application to the Northern East African Rift", Geochemistry, Geophysics, Geosystems , vol. 20, No. 12, Dec. 20, 2019, pp. 6106-6122.
Zheng, Hao et al.; "Fault-constrained velocity tomography in the depth domain"; Geophysical Prospecting for Petroleum; vol. 60, No. 4; Jul. 31, 2021; pp. 556-564.
Mu, Jie et al.; "Application of Precision Velocity Modeling Method for Imaging under Igneous Rocks in Tahe Area"; Science Technology and Engineering; vol. 20, No. 9; Sep. 30, 2020; pp. 3470-3475.
Zheng, Hao et al.; "Gaussian beam tomography with structure-filtering and its applications"; Geophysical & Geochemical Exploration; vol. 44, No. 2; Apr. 30, 2020; pp. 372-380.

* cited by examiner

FAULT CONTROL BEAM TOMOGRAPHY REGULARIZATION METHOD AND APPARATUS, COMPUTER DEVICE, AND STORAGE MEDIUM

CROSS-REFERENCE TO RELATED APPLICATIONS

This application is a U.S. national stage entry of PCT international application no. PCT/CN2022/127620, filed on Oct. 26, 2022, which claims the priority of Chinese patent application CN202111248097.4, filed on Oct. 26, 2021, the content of each is incorporated herein by reference in its entirety.

FIELD OF TECHNOLOGY

The present disclosure relates to the technical field of geophysical exploration, and in particular, to a method and apparatus for fault control beam tomography regularization, a computer device, and a storage medium.

BACKGROUND

At present, the tomography inversion technology has been widely used in the velocity building in depth domain. The tomography inversion technology is ray-based algorithm, and involves subdividing a velocity model into a plurality of regular grids by grid generation and performing inversion on the velocity in each grid by using a ray tracing technology. Low wavenumber components of the velocity may be obtained by the tomography inversion, with adequate inversion precision for depicting a large-scale construction. With the gradual deepening of the exploration, the gradual increasing of exploration the depth and the gradual minification of the exploration target, tectonic characteristics of underground faults have become an important seismic exploration target. Conventional ray tomography no longer meets precision requirements for tectonic characteristics of the faults, and how to achieve high-precision velocity depiction of both sides of a fault is of great importance to high-precision imaging.

SUMMARY

Based on this, with respect to the above technical problem, it is necessary to provide a method for fault control beam tomography regularization, an apparatus for fault control beam tomography regularization, a computer device, and a storage medium.

In one aspect, an embodiment of the present disclosure provides a method for fault control beam tomography regularization. The method includes: acquiring a seismic imaging data volume; extracting a coherence attribute from the seismic imaging data volume; resampling data of the coherence attribute to obtain a resampling coherence attribute corresponding to a tomography grid; obtaining an input ray density; calculating a fault control beam tomography operator according to the resampling coherence attribute and the input ray density; and introducing the fault control beam tomography operator to a tomography inversion target function for regularization constraint, to obtain a tomography inversion target function on which the regularization constraint has been performed.

In another aspect, an embodiment of the present disclosure provides an apparatus for fault control beam tomography regularization. The apparatus includes: a seismic imaging data volume acquiring module configured to acquire a seismic imaging data volume; a coherence attribute extracting module configured to extract a coherence attribute from the seismic imaging data volume; a resampling module configured to resample data of the coherence attribute to obtain a resampling coherence attribute corresponding to a tomography grid; a ray density acquiring module configured to acquire an input ray density; a control beam tomography operator calculating module configured to calculate a fault control beam tomography operator according to the resampling coherence attribute and the input ray density; and a regularizing module configured to introduce the fault control beam tomography operator to a tomography inversion target function for regularization constraint, to obtain a tomography inversion target function on which the regularization constraint has been performed.

In still another aspect, an embodiment of the present disclosure provides a computer device including a memory on which a computer program is stored and a processor, and the processor, when executing the computer program, implements the above method for fault control beam tomography regularization.

In further another aspect, an embodiment of the present disclosure provides a computer readable storage medium, on which a computer program is stored, and the above method for fault control beam tomography regularization is implemented when the computer program is executed by the processor.

DETAILED DESCRIPTION OF THE EMBODIMENTS

In order to make objectives, technical solutions and advantages of the present disclosure clearer, the present disclosure is further described below in detail with reference to accompanying drawings in conjunction with embodiments. It should be understood that, specific embodiments described herein are only for explaining the present disclosure, rather than limiting the present disclosure.

Embodiment One

Figure 1:
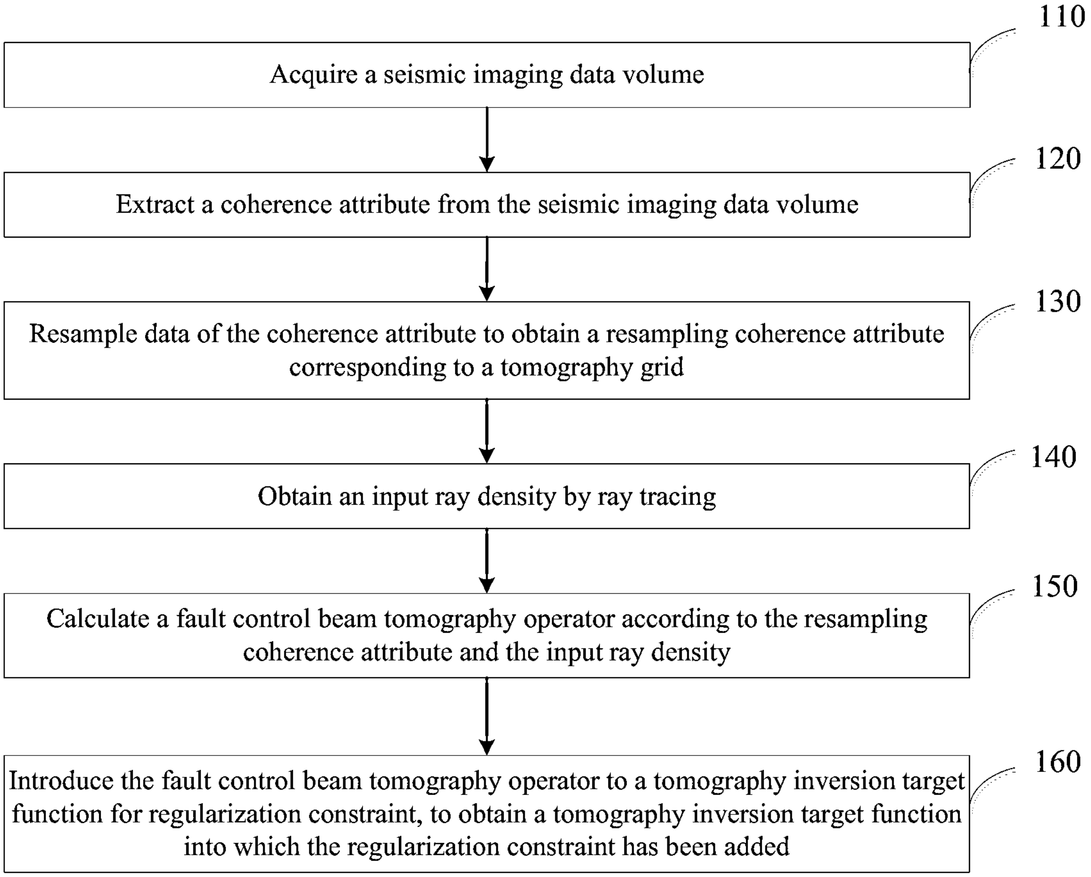
FIG. 1 is a schematic flowchart of a method for fault control beam tomography regularization in an embodiment of the present disclosure.

In the present embodiment, as shown in FIG. 1, a method for fault control beam tomography regularization is provided, and the method includes the following steps 110 to 160.

At step 110, a seismic imaging data volume is acquired.

At step 120, a coherence attribute is extracted from the seismic imaging data volume.

In an embodiment, the step of the extracting the coherence attribute from the seismic imaging data volume includes: extracting a coherence attribute C(m, n, l) from the seismic imaging data volume.

At step 130, data of the coherence attribute is resampled to obtain a resampling coherence attribute corresponding to a tomography grid.

In an embodiment, in the step of the resampling the coherence attribute to obtain the resampling coherence attribute corresponding to the tomography grid, a calculation formula for resampling is represented as:

$$C_{tomo}(\overline{m},\overline{n},\overline{l})=\text{resample}[C(m,n,l)] \quad (1),$$

where $C_{tomo}(\overline{m}, \overline{n}, \overline{l})$ indicates a coherence attribute at a location point $(\overline{m}, \overline{n}, \overline{l})$ after the resampling is performed in a tomography grid size; C(m, n, l) indicates a coherence attribute at the location point (m, n, l) obtained by calculating directly with the seismic imaging data volume; and C(m, n, l) may be obtained by calculating with a coherence attribute formula, and resample[·] indicates a resampling operator.

In the present embodiment, a resampling calculation is performed with an average resampling operator. For example, if the resampling is performed in three dimensions at (m, n, l) with an interval of 1 to form a tomography grid $(\overline{m}, \overline{n}, \overline{l})$, the calculation formula for the resampling may be expressed as:

$$C_{tomo}(\overline{m},\overline{n},\overline{l}) = \frac{\begin{matrix}C(m-1,n,l)+C(m,n,l)+C(m+1,n,l)+\\C(m,n-1,l)+C(m,n+1,l)+C(m,n,l-1)+C(m,n,l+1)\end{matrix}}{7}, \quad (2)$$

where $\overline{m}$=floor(m/2), $\overline{n}$=floor(n/2), $\overline{l}$=floor(l/2), floor [·] is a rounding operator, and a denominator in the above formula is 7, which indicates the resampling for 7 points.

At step 140, an input ray density is obtained by ray tracing.

In the present embodiment, after the resampling coherence attribute is obtained, it is required to obtain an input ray density $G_{tomo}(\overline{m}, \overline{n}, \overline{l})$ by ray tracing.

At step 150, a fault control beam tomography operator is calculated according to the resampling coherence attribute and the input ray density.

In an embodiment, the step of the calculating the fault control beam tomography operator according to the resampling coherence attribute and the input ray density includes: calculating the fault control beam tomography operator according to the resampling coherence attribute and the input ray density $G_{tomo}(\overline{m}, \overline{n}, \overline{l})$. The fault control beam tomography operator is calculated by using the following calculation formula:

$$F(i,j,k) = \frac{\dfrac{\sum_{i-M_1}^{i+M_1}\left(\sum_{j-M_2}^{j+M_2}\left(\sum_{k-M_3}^{k+M_3} sqrt(C_{tomo}[i-M_1,\, j-M_2,\, k-M_3]\square G_{tomo}[i-M_1,\, j-M_2,\, k-M_3])\right)\right)}{(2M_1+1)(2M_2+1)(2M_3+1)}}{\sum_{i-M_1}^{i+M_1}\sum_{j-M_2}^{j+M_2}\sum_{k-M_3}^{k+M_3} sqrt\left((C_{tomo}[i-M_1,\, j-M_2,\, k-M_3])^2+(G_{tomo}[i-M_1,\, j-M_2,\, k-M_3])^2\right)}, \quad (3)$$

where F(i, j, k) is a fault control beam tomography operator at a grid location point (i, j, k) $C_{tomo}[i-M_1, j-M_2, k-M_3]$ indicates a resampling coherence attribute at the grid location point (i, j, k) in a calculation time window $(2M_1+1)\times(2M_2+1)\times(2M_3+1)$, $G_{tomo}[i-M_1, j-M_2, k-M_3]$ indicates an input ray density value at the grid location point (i, j, k) in the time window $(2M_1+1)\times(2M_2+1)\times(2M_3+1)$ and $M_1$, $M_2$ and $M_3$ are half time window lengths of three dimensions, respectively.

At step 160, the fault control beam tomography operator is introduced to a tomography inversion target function for regularization constraint, to obtain a tomography inversion target function into which the regularization constraint has been added.

In the present embodiment, by introducing an operator F to a tomography inversion matrix, a control beam tomography velocity modeling technology directed to a fault can be implemented.

In an embodiment, in the step of the introducing the fault control beam tomography operator to the tomography inversion target function for regularization constraint, a preconditioned regularization operator is used:

$$LFu=\Delta\tau \quad (4),$$

where L is a tomography inversion linearized operator, F is the fault control beam tomography operator designed by formula (3), and u is a preconditioned solution.

In an embodiment, after the step of the obtaining the tomography inversion target function into which the regularization constraint has been added, the tomography inversion target function into which the regularization constraint has been added is solved to obtain a velocity around a fault. The method for fault control beam tomography regularization in the present disclosure adopts a strategy of solving by offset iteration, and a fault velocity obtained by solving the tomography inversion target function into which the regularization constraint has been added may be used to acquire a seismic imaging data volume in a next cycle of tomography inversion.

In the present embodiment, a high-precision velocity model directed to the fault may be obtained by solving the formula (4), and the velocity modeling precision of both sides of the fault can be improved evidently.

In an embodiment, the step of the solving the tomography inversion target function into which the regularization constraint has been added to obtain the velocity around the fault includes: solving the tomography inversion target function into which the regularization constraint has been added by using a preconditioned conjugate gradient method to obtain the velocity around the fault.

In the present embodiment, a calculation formula for the preconditioned conjugate gradient method is as follows:

$$F^TL^TLFu=FL\Delta\tau \quad (5).$$

In the above embodiments, by using the operator to control a ray beam direction for keeping away from an anomalous body so as to avoid scattering that cannot be simulated, a path of ray tracing can be ensured to be accurate; and meanwhile by performing data-driven monitoring on an abnormal ray beam path so as to further eliminate a multi-path (error-path) ray beam caused by a velocity abnormity, tomography stability and precision can be improved.

Embodiment Two

The present disclosure involves in technology research and develop against a fault velocity modeling difficulty. The previous cycle during the offset velocity modeling, and the data of the coherence attribute is resampled. A specific calculation formula for the resampling is as follows:

$$C_{tomo}(\overline{m},\overline{n},\overline{l})=\text{resample}[C(m,n,l)] \quad (1)$$

where $C_{tomo}(\overline{m}, \overline{n}, \overline{l})$ indicates a coherence attribute at a location point $(\overline{m}, \overline{n}, \overline{l})$ after the resampling is performed in a tomography grid size, C(m, n, l) indicates a coherence attribute at the location point (m, n, l) obtained by calculating with the seismic imaging data volume, and resample[·] indicates a resampling operator. The present disclosure involves performing a resampling calculation with an average resampling operator. For example, if the resampling is performed in three dimensions at (m, n, l) with an interval of 1 to form a tomography grid $(\overline{m}, \overline{n}, \overline{l})$, the above formula may be expressed as:

$$C_{tomo}(\overline{m},\overline{n},\overline{l}) = \frac{\begin{gathered}C(m-1,n,l)+C(m,n,l)+C(m+1,n,l)+C(m,n-1,l)+\\ C(m,n+1,l)+C(m,n,l-1)+C(m,n,l+1)\end{gathered}}{7}, \quad (2)$$

where $\overline{m}$=floor(m/2), $\overline{n}$=floor(n/2), $\overline{l}$=floor(l/2) floor[e] is a rounding operator, and a denominator in the above formula is 7, which indicates resampling for 7 points. After the resampling coherence attribute is obtained, it is required to obtain an input ray density $G_{tomo}(\overline{m}, \overline{n}, \overline{l})$ by ray tracing based on a ray tracing result of the previous cycle, and then a fault control beam tomography regularization operator is calculated by using the following formula:

$$F(i,j,k) = \frac{\sum_{i-M_1}^{i+M_1}\left(\sum_{j-M_2}^{j+M_2}\left(\sum_{k-M_3}^{k+M_3} sqrt(C_{tomo}[i-M_1,j-M_2,k-M_3]\square G_{tomo}[i-M_1,j-M_2,k-M_3])\right)\right)}{(2M_1+1)(2M_2+1)(2M_3+1)}, \quad (3)$$
$$\sum_{i-M_1}^{i+M_1}\sum_{j-M_2}^{j+M_2}\sum_{k-M_3}^{k+M_3} sqrt\left((C_{tomo}[i-M_1,j-M_2,k-M_3])^2+(G_{tomo}[i-M_1,j-M_2,k-M_3])^2\right)$$

method adopted includes: guiding and adjusting a ray beam distribution by a coherence attribute, so as to form a control beam tomography regularization operator which is introduced to a target function. Effects of the regularization operator mainly lie in the following two aspects: by using the operator to control a ray beam direction for keeping away from an anomalous body, so as to avoid scattering that cannot be simulated and enable an accurate path of ray tracing; and meanwhile, by performing data-driven monitoring on an abnormal ray path, so as to further eliminate a multi-path (error-path) ray beam caused by a velocity abnormity and improve tomography stability and precision.

The method for fault control beam tomography regularization in the present disclosure is established on the basis of an offset velocity modeling process, and uses a strategy of solving by offset iteration, and each cycle of updating is performed by using a result of a previous cycle as data input. First, a coherence attribute is extracted from a seismic imaging data volume corresponding to a velocity in the where F(i, j, k) is a fault control beam regularization operator at a grid location point (i, j, k), $C_{tomo}[i-M_1, j-M_2, k-M_3]$ indicates a resampling coherence attribute at the grid location point (i, j, k) in a calculation time window $(2M_1+1)\times(2M_2+1)\times(2M_3+1)$, $G_{tomo}[i-M_1, j-M_2, k-M_3]$ indicates an ray density value at the grid location point (i, j, k) in the time window $(2M_1+1)\times(2M_2+1)\times(2M_3+1)$, and $M_1$, $M_2$ and $M_3$ are half time window lengths of three dimensions, respectively. By introducing an operator F to a tomography inversion matrix, a control beam tomography velocity modeling technology directed to a fault can be implemented. A preconditioned regularization operator is used to introduce the operator F to the tomography inversion matrix by a specific calculation formula as follows:

$$LFu=\Delta\tau \quad (4),$$

where L is a tomography inversion linearized operator, F is a preconditioned regularization operator designed by formula (3), a key of the present disclosure being construction of the operator F, and u is a preconditioned solution. A high-precision velocity model directed to the fault can be obtained by solving the calculation formula (4), and the velocity modeling precision of both sides of the fault can be improved evidently. A preconditioned conjugate gradient method may be used to solve the calculation formula, and a specific calculation formula is as follows:

$$F^T L^T L F u = F L \Delta\tau \tag{5}$$

In an embodiment, after the step of the obtaining the tomography inversion target function into which the regularization constraint has been added, the tomography inversion target function into which the regularization constraint has been added is solved to obtain a velocity around a fault. The method for fault control beam tomography regularization in the present disclosure adopts a strategy of solving by offset iteration, and a fault velocity obtained by solving the tomography inversion target function into which the regularization constraint has been added may be used to acquire a seismic imaging data volume in a next cycle of tomography inversion.

The present disclosure involves technology research and develop against a modeling difficulty of the velocity around a fault. The method adopted includes: guiding and adjusting a ray beam distribution by a coherence attribute, so as to form a control beam tomography regularization operator which is introduced to a target function. Effects of the regularization operator mainly lie in the following two aspects: by using the operator to control a ray beam direction for keeping away from an anomalous body, so as to avoid scattering that cannot be simulated and enable an accurate path of ray tracing; and meanwhile, by performing data-driven monitoring on an abnormal ray beam path so as to further eliminate a multi-path (error-path) ray beam caused by a velocity abnormity and improve tomography stability and precision. Specific steps of the method include as follows: 1) extracting a coherence attribute C(m, n, l) from a seismic imaging data volume; 2) resampling the coherence attribute to obtain a resampling coherence attribute $C_{tomo}(\bar{m}, \bar{n}, \bar{l})$ corresponding to a tomography grid; 3) obtaining an input ray density $G_{tomo}(\bar{m}, \bar{n}, \bar{l})$ by ray tracing; 4) constructing a fault control beam tomography operator F by using the resampling coherence attribute and the input ray density obtained from step 2 to step 3, and introducing the fault control beam tomography operator F to a tomography inversion target function for regularization constraint; and 5) solving the target function to obtain a velocity u around a fault, so as to complete the high-precision velocity modeling for the fault.

In order to demonstrate the accuracy and effectiveness of the method and show that the method brings out higher precision, explanations are made by actual data testing.

Figure 4A:
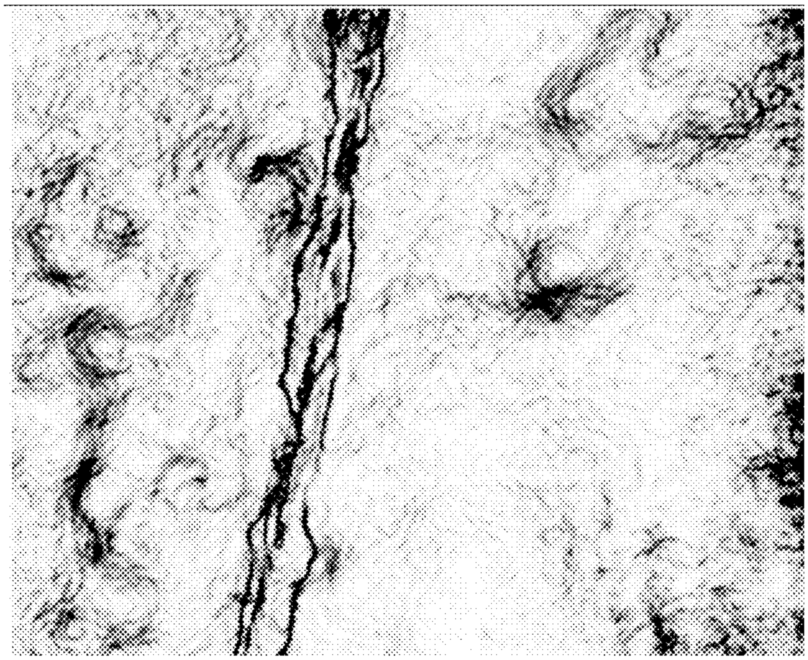
FIG. 4A is a schematic diagram of a coherence attribute obtained by calculating with a seismic imaging data volume in an embodiment of the present disclosure.

FIG. 4A shows a coherence attribute obtained by calculating with a seismic imaging data volume in an embodiment. As can be seen from FIG. 4A, the fault is depicted clearly, which may be used for fault guidance.

Figure 4B:
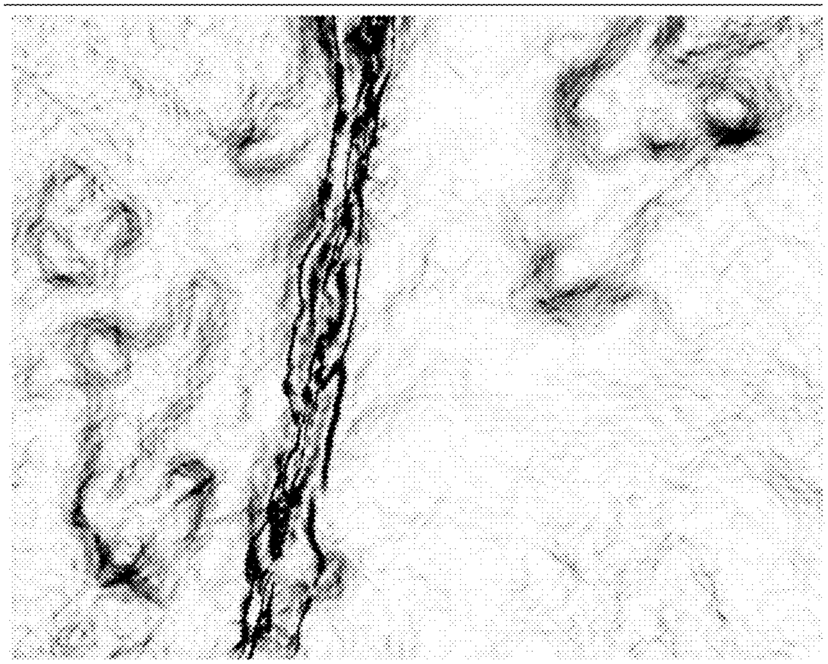
FIG. 4B is a schematic diagram of a resampling coherence attribute obtained after resampling is performed in an embodiment of the present disclosure.

FIG. 4B shows a resampling coherence attribute obtained after the resampling is performed. As can be seen from FIG. 4B, by performing the resampling, a signal to noise ratio is improved, and the fault is depicted more clearly, which is more favorable to fault guidance.

Figure 4C:
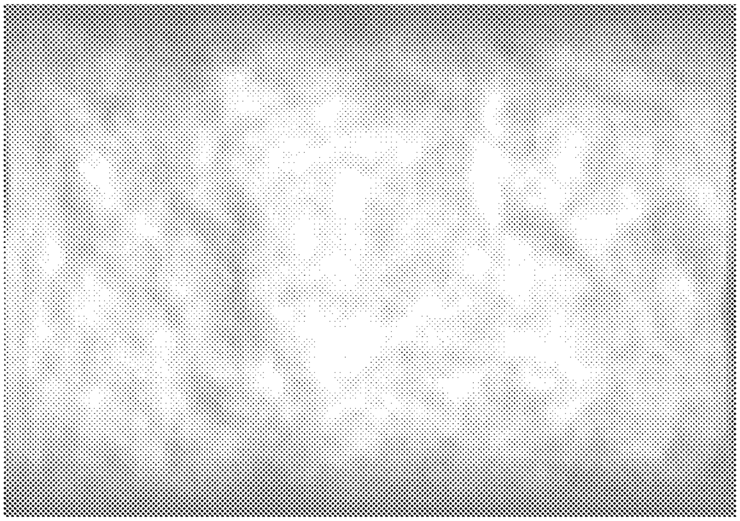
FIG. 4C is a schematic diagram of an input ray density obtained by ray tracing in an embodiment of the present disclosure.

FIG. 4C shows an input ray density obtained by ray tracing in an embodiment, and the input ray density is used to construct the fault control beam tomography regularization operator. As can be seen from FIG. 4C, without the constraint of the fault control beam tomography regularization operator, the ray density appears disordered on the whole, and there are multiple partial abnormities, which is not beneficial to a high-precision velocity inversion.

Figure 3:
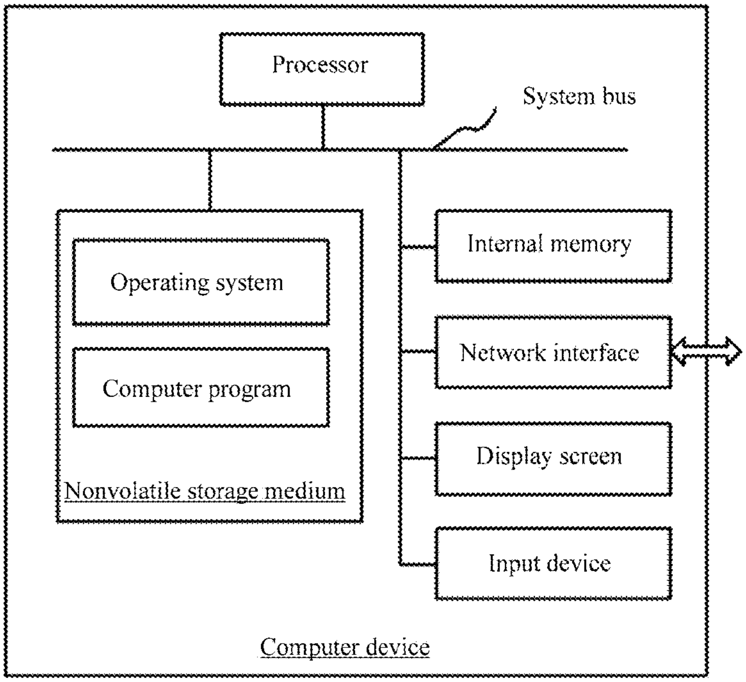
FIG. 3 is a diagram of an internal structure of a computer device in an embodiment of the present disclosure.
Figure 4D:
FIG. 4D is a schematic diagram of an output ray density obtained by ray tracing after constraint of a fault control beam tomography regularization operator is added in an embodiment of the present disclosure.

FIG. 4D shows an output ray density obtained by ray beam tracing after the constraint of the fault control beam tomography regularization operator is added. As can be seen from FIG. 4D, after the fault control beam tomography regularization technology is adopted, compared with the result of FIG. 3, the ray density is more uniform, and a shadow of the guidance fault can be seen in the ray density; and meanwhile, the output ray density may also be used as the input ray density for a next cycle of iteration updating.

Figure 4E:
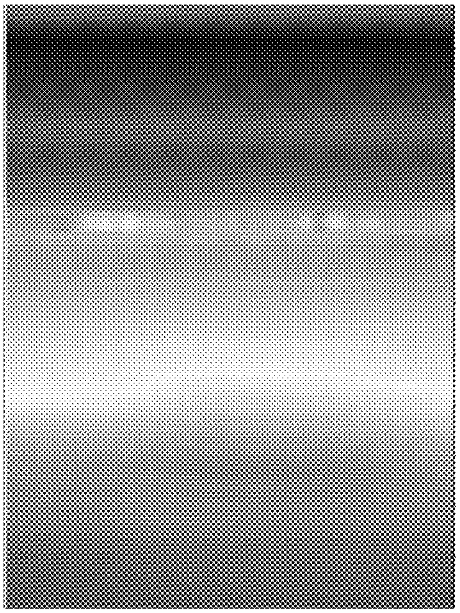
FIG. 4E is a schematic diagram of a velocity model obtained by a conventional tomography inversion in an embodiment of the present disclosure.

FIG. 4E shows a velocity model obtained by using a conventional tomography inversion velocity modeling technology. As can be seen from FIG. 4E, a large-scale construction is depicted, but a velocity difference between both sides of the fault is not shown.

Figure 4F:
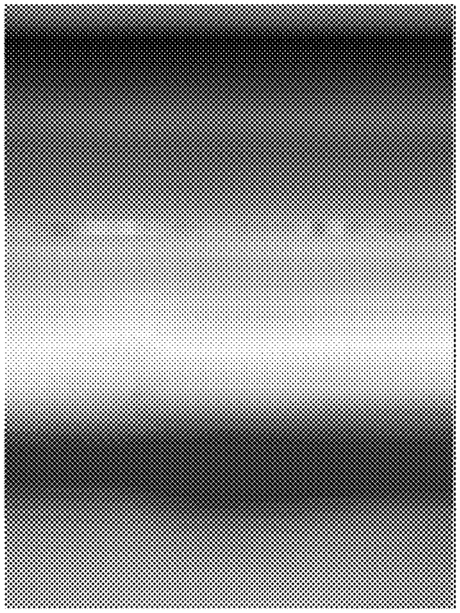
FIG. 4F is a schematic diagram of a velocity model obtained by performing a tomography inversion after a fault control beam tomography regularization operator is added in an embodiment of the present disclosure.
Figure 4G:
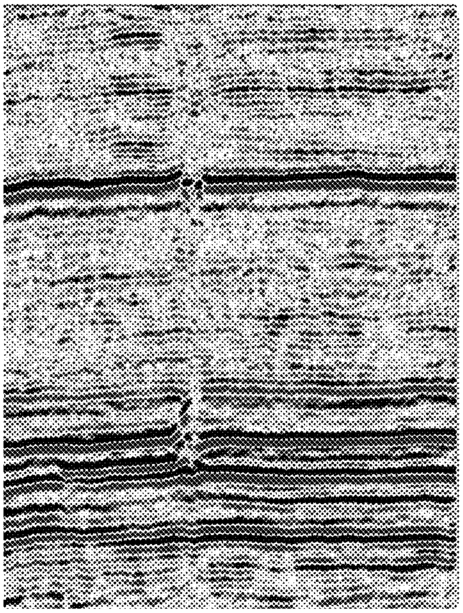
FIG. 4G is a schematic diagram of an imaging result corresponding to a conventional tomography inversion velocity model in an embodiment of the present disclosure.

FIG. 4F shows a velocity model obtained by performing a tomography inversion after the fault control beam tomography regularization operator is added. As can be seen from FIG. 4F, after the fault control beam tomography regularization operator is added, a velocity response at both sides of the fault can be evidently shown in the velocity model, and the precision of the velocity model is improved evidently FIG. 4G shows an imaging data volume corresponding to the conventional tomography inversion velocity model in FIG. 4E. As can be seen from FIG. 4G, the precision of fault imaging is low, and interior details are depicted poorly.

Figure 4H:
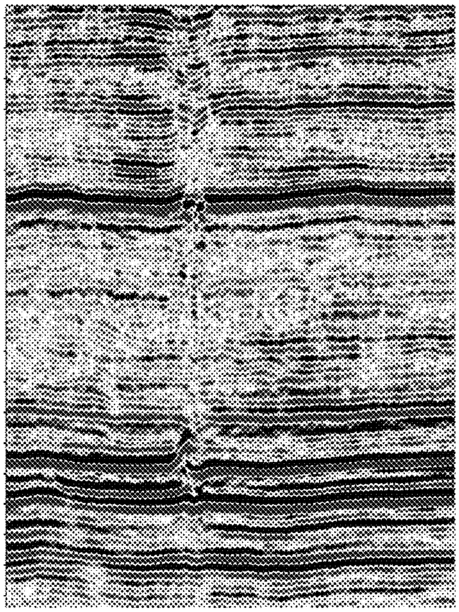
FIG. 4H is a schematic diagram of an imaging result corresponding to a velocity model on which a tomography inversion is performed after a fault control beam tomography regularization operator is added in an embodiment of the present disclosure.

FIG. 4H shows an imaging data volume corresponding to the velocity model obtained by performing the tomography inversion after the fault control beam tomography regularization operator is added. As can be seen from FIG. 4H, the precision of main fault imaging is evidently improved, with more clear-cut fault points, clearer fault surfaces, and richer interior details.

It should be understood that, although respective steps in the flowchart of FIG. 1 are shown sequentially with arrows, these steps are not necessarily performed sequentially according to an order shown by the arrows. Unless clearly indicated herein, these steps are not limited in a strict order and may be performed in other orders. In addition, at least a part of steps in FIG. 1 may include multiple sub-steps or multiple stages, and these sub-steps or stages are not necessarily performed at the same time instant, but may be performed at different time instants; and these sub-steps or stages may not necessarily be performed successively, but may be performed in turn or alternatively with at least a part of other steps or at least a part of sub-steps or stages of other steps.

Embodiment Three

Figure 2:
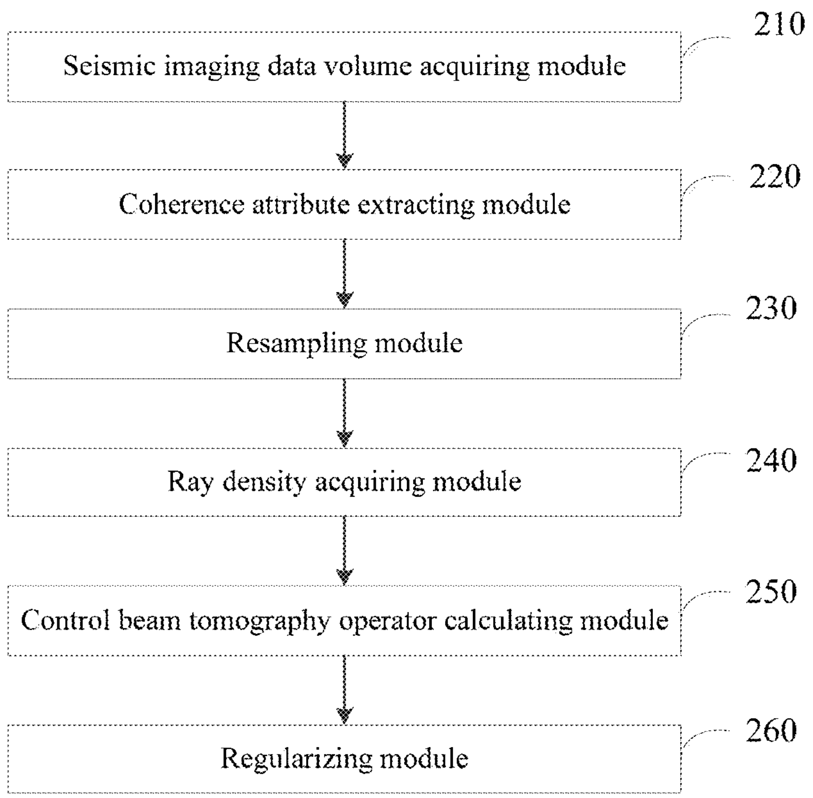
FIG. 2 is a block diagram of a structure of an apparatus for fault control beam tomography regularization in an embodiment of the present disclosure.

In the present embodiment, as shown in FIG. 2, an apparatus for fault control beam tomography regularization is provided, and the apparatus includes: a seismic imaging data volume acquiring module 210, a coherence attribute extracting module 220, a resampling module 230, a ray density acquiring module 240, a control beam tomography operator calculating module 250, and a regularizing module 260.

The seismic imaging data volume acquiring module 210 is configured to acquire a seismic imaging data volume. The coherence attribute extracting module 220 is configured to extract a coherence attribute from the seismic imaging data volume. The resampling module 230 is configured to resample the data of the coherence attribute to obtain a resampling coherence attribute corresponding to a tomography grid. The ray density acquiring module 240 is configured to acquire an input ray density. The control beam tomography operator calculating module 250 is configured to calculate a fault control beam tomography operator according to the resampling coherence attribute and the input ray density. The regularizing module 260 is configured to introduce the fault control beam tomography operator to a tomography inversion target function for regularization constraint, to obtain a tomography inversion target function into which the regularization constraint has been added.

In an embodiment, the seismic imaging data volume acquiring module includes an imaging result acquiring unit and a coherence attribute extracting unit. The imaging result acquiring unit is configured to acquire an input seismic imaging data volume. The coherence attribute extracting unit is configured to extract the coherence attribute from the input seismic imaging data volume.

In an embodiment, the resampling module is configured to resample the data of the coherence attribute to obtain the resampling coherence attribute corresponding to the tomography grid. A calculation formula of the resampling is as follows:

$$C_{tomo}(\overline{m},\overline{n},\overline{l})=\text{resample}[C(m,n,l)],$$

where $C_{tomo}(\overline{m}, \overline{n}, \overline{l})$ indicates a coherence attribute at a location point $(\overline{m}, \overline{n}, \overline{l})$ after the resampling is performed in a tomography grid size, C(m, n, l) indicates a coherence attribute at the location point (m, n, l) obtained by calculating directly with an input imaging data volume, and resample [·] indicates a resampling operator.

In an embodiment, the ray density acquiring module is configured to acquire an input ray density $G_{tomo}(\overline{m}, \overline{n}, \overline{l})$.

In an embodiment, the control beam tomography operator calculating module is configured to calculate a fault control beam tomography operator according to the resampling coherence attribute and the input ray density $G_{tomo}(\overline{m}, \overline{n}, \overline{l})$. The fault control beam tomography operator is calculated with the following calculation formula:

$$F(i,j,k)=\frac{\sum_{i-M_1}^{i+M_1}\left(\sum_{j-M_2}^{j+M_2}\left(\sum_{k-M_3}^{k+M_3} sqrt(C_{tomo}[i-M_1,j-M_2,k-M_3]\square G_{tomo}[i-M_1,j-M_2,k-M_3])\right)\right)}{(2M_1+1)(2M_2+1)(2M_3+1)\sum_{i-M_1}^{i+M_1}\sum_{j-M_2}^{j+M_2}\sum_{k-M_3}^{k+M_3} sqrt((C_{tomo}[i-M_1,j-M_2,k-M_3])^2+(G_{tomo}[i-M_1,j-M_2,k-M_3])^2)},$$

where F(i, j, k) is a fault control beam tomography operator at a grid location point (i, j, k) $C_{tomo}[i-M_1, j-M_2, k-M_3]$ indicates a resampling coherence attribute at the grid location point (i, j, k) in a calculation time window $(2M_1+1)\times(2M_2+1)\times(2M_3+1)$ $G_{tomo}[i-M_1, j-M_2, k-M_3]$ indicates a ray density value at the grid location point (i, j, k) in the time window $(2M_1+1)\times(2M_2+1)\times(2M_3+1)$, and $M_1$, $M_2$ and $M_3$ are half time window lengths of three dimensions, respectively.

In an embodiment, the regularizing module is configured to introduce the fault control beam tomography operator to the tomography inversion target function for regularization constraint, and a preconditioned regularization operator is used for introducing the fault control beam tomography operator to the tomography inversion target function by a calculation formula:

$$LFu=\Delta\tau \quad (4),$$

where L is a tomography inversion linearized operator, F is the fault control beam tomography operator designed by formula (3), and u is a preconditioned solution.

In an embodiment, the apparatus for fault control beam tomography regularization further includes a function solving module configured to solve a tomography inversion target function into which the regularization constraint has been added, to obtain a velocity around the fault. The apparatus for fault control beam tomography regularization in the present disclosure adopts a strategy of solving by offset iteration, and a fault velocity obtained by the function solving module may be used to acquire the seismic imaging data volume in a next cycle of tomography inversion.

In an embodiment, the function solving module is further configured to solve the tomography inversion target function into which the regularization constraint has been added by using a preconditioned conjugate gradient method to obtain the velocity around the fault.

Specific limitations on the apparatus for fault control beam tomography regularization may be referred to the limitations on the method for fault control beam tomography regularization above, and details thereof are not further described herein. All or part of respective units in the above apparatus for fault control beam tomography regularization may be implemented by software, hardware, or a combination thereof. The above respective units may be implemented in the form of hardware embedded in or independent from the processor of the computer device, and may alternatively be implemented in the form of software stored in the memory of the computer device, so as to facilitate invoking and executing, by the processor, operations corresponding to the above respective units.

Embodiment Four

In the present embodiment, a computer device is provided. An internal structure of the computer device is shown in FIG. 3. The computer device includes a processor, a memory, a network interface, a display screen, and an input device which are connected via a system bus. The processor of the computer device is used to provide computing and controlling capabilities. The memory of the computer device includes a non-volatile storage medium and an internal memory. The non-volatile storage medium stores an operating system and a computer program, and the non-volatile storage medium is deployed with a database for seismic data. The internal memory provides an environment for running of the operating system and the computer program in the non-volatile storage medium. The network interface of the computer device is configured to communicate with other computer devices deployed with application software. The computer program is executed by the processor to perform a method for fault control beam tomography regularization. The display screen of the computer device may be a liquid crystal display screen or an electronic ink display screen. The input device of the computer device may be a touch layer covered on the display screen, may alternatively be a push button, a trackball, or a touchpad disposed on a housing of the computer device, and may alternatively be a keyboard, a touchpad, a mouse and the like connected externally to the computer device.

Those skilled in the art may understand that, the structure shown in FIG. 3 only involves part of the structure related to the solution of the present disclosure, and does not constitute a limitation on the computer device to which the solution of the present disclosure is applied. The specific computer device may include more or less components than those shown in FIG. 3, may combine some components, or may have a different arrangement of components.

In an embodiment, a computer device is provided, which includes a memory storing a computer program and a processor. The processor, when executing the computer program, implements the following steps: acquiring a seismic imaging data volume; extracting a coherence attribute from the seismic imaging data volume; resampling data of the coherence attribute to obtain a resampling coherence attribute corresponding to a tomography grid; obtaining an input ray density by ray tracing; calculating a fault control beam tomography operator according to the resampling coherence attribute and the input ray density; introducing the fault control beam tomography operator to a tomography inversion target function for regularization constraint, to obtain a tomography inversion target function into which the regularization constraint has been added.

In an embodiment, the processor, when executing the computer program, further implements the following steps: acquiring the seismic imaging data volume; and extracting the coherence attribute from the seismic imaging data volume.

In an embodiment, the processor, when executing the computer program, implements the step of the resampling the data of the coherence attribute to obtain a resampling coherence attribute corresponding to a tomography grid, by a calculation formula of resampling:

$$C_{tomo}(\bar{m},\bar{n},\bar{l})=\text{resample}[C(m,n,l)],$$

where $C_{tomo}(\bar{m}, \bar{n}, \bar{l})$ indicates a coherence attribute at a location point $(\bar{m}, \bar{n}, \bar{l})$ after the resampling is performed in a tomography grid size, C(m, n, l) indicates a coherence attribute at the location point (m, n, l) obtained by calculating with the seismic imaging data volume, and resample [·] indicates a resampling operator.

In an embodiment, the processor, when executing the computer program, further implements the following step: calculating a fault control beam tomography operator according to the resampling coherence attribute and the input ray density $G_{tomo}(\bar{m}, \bar{n}, \bar{l})$. The fault control beam tomography operator is calculated with the following calculation formula:

$$F(i,j,k)=\frac{\sum_{i-M_1}^{i+M_1}\left(\sum_{j-M_2}^{j+M_2}\left(\sum_{k-M_3}^{k+M_3} sqrt(C_{tomo}[i-M_1,j-M_2,k-M_3]\square G_{tomo}[i-M_1,j-M_2,k-M_3])\right)\right)}{(2M_1+1)(2M_2+1)(2M_3+1)\sum_{i-M_1}^{i+M_1}\sum_{j-M_2}^{j+M_2}\sum_{k-M_3}^{k+M_3} sqrt((C_{tomo}[i-M_1,j-M_2,k-M_3])^2+(G_{tomo}[i-M_1,j-M_2,k-M_3])^2)},$$

where F(i, j, k) is a fault control beam tomography operator at a grid location point (i, j, k), $C_{tomo}[i-M_1, j-M_2, k-M_3]$ indicates a resampling coherence attribute at the grid location point (i, j, k) in a calculation time window $(2M_1+1)\times(2M_2+1)\times(2M_3+1)$ $G_{tomo}[i-M_1, j-M_2, k-M_3]$ indicates a ray density value at the grid location point (i, j, k) in a time window $(2M_1+1)\times(2M_2+1)\times(2M_3+1)$ and $M_1$, $M_2$ and $M_3$ are a half time window length of three dimensions, respectively.

In an embodiment, the processor, when executing the computer program, implements the step of introducing the fault control beam tomography operator to the tomography inversion target function for regularization constraint, and a preconditioned regularization operator is used to introduce the fault control beam tomography operator to the tomography inversion target function by a calculation formula:

$$LFu=\Delta\tau \qquad (4),$$

where L is a tomography inversion linearized operator, F is the fault control beam tomography operator, and u is a preconditioned solution.

In an embodiment, the processor, when executing the computer program, further implements the step of solving a tomography inversion target function into which the regularization constraint has been added, to obtain a velocity around the fault. The processor adopts a strategy of solving by offset iteration, and a fault velocity obtained by solving the tomography inversion target function into which the regularization constraint has been added may be used to acquire a seismic imaging data volume in a next cycle of tomography inversion.

In an embodiment, the processor, when executing the computer program, further implements the step of solving the tomography inversion target function into which the regularization constraint has been added by using a preconditioned conjugate gradient method to obtain the velocity around the fault.

Embodiment Five

In the present embodiment, a computer readable storage medium is provided, on which a computer program is stored. When the computer program is executed by a processor, the following steps are implemented: acquiring a seismic imaging data volume; extracting a coherence attribute from the seismic imaging data volume; resampling data of the coherence attribute to obtain a resampling coherence attribute corresponding to a tomography grid; obtaining an input ray density by ray tracing; calculating a fault control beam tomography operator according to the resampling coherence attribute and the ray density; introducing the fault control beam tomography operator to a tomography inversion target function for regularization constraint, to obtain a tomography inversion target function into which the regularization constraint has been added.

In an embodiment, when the computer program is executed by the processor, the following step is further implemented: acquiring the seismic imaging data volume; and extracting the coherence attribute from the seismic imaging data volume.

In an embodiment, when the computer program is executed by the processor, the following step is further implemented: resampling the data of the coherence attribute to obtain a resampling coherence attribute corresponding to a tomography grid by a calculation formula of resampling:

$$C_{tomo}(\bar{m},\bar{n},\bar{l})=\text{resample}[C(m,n,l)],$$

where $C_{tomo}(\bar{m}, \bar{n}, \bar{l})$ indicates a coherence attribute at a location point $(\bar{m}, \bar{n}, \bar{l})$ after the resampling is performed in a tomography grid size, C(m, n, l) indicates a coherence attribute at the location point (m, n, l) obtained by calculating with the seismic imaging data volume, and resample [·] indicates a resampling operator.

In an embodiment, when the computer program is executed by the processor, the following step is further implemented: calculating the fault control beam tomography operator according to the resampling coherence attribute and the ray density $G_{tomo}(\overline{m}, \overline{n}, \overline{l})$. The fault control beam tomography operator is calculated with the following calculation formula:

$$F(i, j, k) = \frac{\sum_{i-M_1}^{i+M_1}\left(\sum_{j-M_2}^{j+M_2}\left(\sum_{k-M_3}^{k+M_3} sqrt(C_{tomo}[i-M_1, j-M_2, k-M_3]\Box G_{tomo}[i-M_1, j-M_2, k-M_3])\right)\right)}{(2M_1+1)(2M_2+1)(2M_3+1)\sum_{i-M_1}^{i+M_1}\sum_{j-M_2}^{j+M_2}\sum_{k-M_3}^{k+M_3} sqrt((C_{tomo}[i-M_1, j-M_2, k-M_3])^2 + (G_{tomo}[i-M_1, j-M_2, k-M_3])^2)},$$

where F(i, j, k) is a fault control beam tomography operator at a grid location point (i, j, k), $C_{tomo}[i-M_1, j-M_2, k-M_3]$ indicates a resampling coherence attribute at the grid location point (i, j, k) in a calculation time window $(2M_1+1)\times(2M_2+1)\times(2M_3+1)$, $G_{tomo}[i-M_1, j-M_2, k-M_3]$ indicates a ray density value at the grid location point (i, j, k) in the time window $(2M_1+1)\times(2M_2+1)\times(2M_3+1)$, and $M_1$, $M_2$ and $M_3$ are half time window lengths of three dimensions, respectively.

In an embodiment, when the computer program is executed by the processor, the following step is further implemented: introducing the fault control beam tomography operator to the tomography inversion target function for regularization constraint, and a preconditioned regularization operator is uses to introduce the fault control beam tomography operator to the tomography inversion target function by a calculation formula:

$$LFu=\Delta\tau,$$

where L is a tomography inversion linearized operator, F is the fault control beam tomography operator, and u is a preconditioned solution.

In an embodiment, when the computer program is executed by the processor, the following step is further implemented: solving the tomography inversion target function into which the regularization constraint has been added, to obtain a velocity around the fault. The processor adopts a strategy of solving by offset iteration, and a fault velocity obtained by solving the tomography inversion target function into which the regularization constraint has been added may be used to acquire the seismic imaging data volume in a next cycle of tomography inversion.

In an embodiment, when the computer program is executed by the processor, the following step is further implemented: solving the tomography inversion target function into which the regularization constraint has been added by using a preconditioned conjugate gradient method to obtain the velocity around the fault.

By the above method for fault control beam tomography regularization, the apparatus for fault control beam tomography regularization, the computer device, and the storage medium, the fault control beam tomography operator is used to control a ray beam direction for keeping away from an anomalous body, so as to avoid scattering that cannot be simulated, a path of ray tracing can be ensured to be accurate; and meanwhile by performing data-driven monitoring on an abnormal ray beam path so as to further eliminate a multi-path (error-path) ray beam caused by a velocity abnormity, tomography stability and precision can be improved.

A person of ordinary skills may understand that all or part of the process in the above method embodiments may be completed by using the computer program to instruct relevant hardware. The computer program may be stored in a non-volatile computer readable storage medium, and when the computer program is executed, the process of the above method embodiments may be included. Any memory, storage, database, or other medium referred in respective embodiments provided in the present disclosure may include a non-volatile memory and/or a volatile memory. The non-volatile memory may include a read-only memory (ROM), a programmable read-only memory (PROM), an electrically programmable read-only-memory (EPROM), or a flash memory. The volatile memory may include a random access memory (RAM) or an external cache memory. As illustration rather than limitation, the RAM may be available in various forms, such as a static random access memory (SRAM), a dynamic random access memory (DRAM), a synchronous dynamic random access memory (SDRAM), double data rate synchronous dynamic random access memory (DDRSDRAM), enhanced synchronous dynamic random access memory (ESDRAM), synchronization link dynamic random access memory (SLDRAM), rambus dynamic random access memory (RDRAM), direct rambus dynamic random access memory (DRDRAM), and rambus dynamic random access memory (RDRAM) and the like.

Respective technical features in the above embodiments may be combined in any manner. For brevity of description, not all possible combinations of respective technical features in the above embodiments are described, but these combinations of features shall all fall into the scope of recitation of the description as long as there is no conflict.

The above embodiments are only several embodiments of the present embodiments and are described specifically and in detail, but cannot be understood as limitation on the scope of the present disclosure. It should be noted that, for a person of ordinary skills in the art, several variations and improvements can be made without departing the concept of the present disclosure, and these variations and improvements all fall into the protection scope of the present disclosure. Therefore, the protection scope of the present disclosure shall be confined by the appended claims.

What is claimed is:

1. A method for fault control beam tomography regularization, comprising:

acquiring, by a seismic imaging data volume acquiring module, a seismic imaging data volume;

extracting, by a coherence attribute extracting module, a coherence attribute from the seismic imaging data volume;

resampling, by a resampling module, data of the coherence attribute to obtain a resampling coherence attribute corresponding to a tomography grid;

obtaining, by a ray density acquiring module, an input ray density;

calculating, by a control beam tomography operator calculating module, a fault control beam tomography operator according to the resampling coherence attribute and the input ray density; and introducing, by a regularizing module, the fault control beam tomography operator to a tomography inversion target function for regularization constraint to obtain a tomography inversion target function subject to the regularization constraint, wherein:

the calculating step comprises:

calculating the control beam tomography operator according to the resampling coherence attribute and the input ray density $G_{tomo}(\overline{m}, \overline{n}, \overline{l})$, wherein the control beam tomography operator is calculated using the following formula:

$$F(i, j, k) = \frac{\sum_{i-M_1}^{i+M_1}\left(\sum_{j-M_2}^{j+M_2}\left(\sum_{k-M_3}^{k+M_3} sqrt(C_{tomo}[i-M_1, j-M_2, k-M_3]\square G_{tomo}[i-M_1, j-M_2, k-M_3])\right)\right)}{(2M_1+1)(2M_2+1)(2M_3+1)\sum_{i-M_1}^{i+M_1}\sum_{j-M_2}^{j+M_2}\sum_{k-M_3}^{k+M_3} sqrt((C_{tomo}[i-M_1, j-M_2, k-M_3])^2+(G_{tomo}[i-M_1, j-M_2, k-M_3])^2)},$$

wherein F(i, j, k) is a control beam tomography operator at a grid point (i, j, k), $C_{tomo}[i-M_1, j-M_2, k-M_3]$ is a resampling coherence attribute at the grid location point (i, j, k) in a calculation time window of $(2M_1+1)\times(2M_2+1)\times(2M_3+1)$, $G_{tomo}(\overline{m}, \overline{n}, \overline{l})$ is an input ray density value at the grid location point (i, j, k) in the time window of $(2M_1+1)\times(2M_2+1)\times(2M_3+1)$, and $M_1$, $M_2$, and $M_3$ are half time window lengths of three dimensions, respectively.

2. The method according to claim 1, wherein in a step of the resampling step, the coherence attribute is calculated based on the following formula:

$$C_{tomo}(\overline{m},\overline{n},\overline{l})=\text{resample}[C(m,n,l)],$$

wherein $C_{tomo}(\overline{m}, \overline{n}, \overline{l})$ is a coherence attribute at the location point $(\overline{m}, \overline{n}, \overline{l})$ after the resampling is performed in a tomography grid size, C(m, n, l) is a coherence attribute at the location point (m, n, l) obtained by calculating with the seismic imaging data volume, and resample[·] is a resampling operator.

3. The method according to claim 1, wherein in the introducing step, a preconditioned regularization operator is used to introduce the fault control beam tomography operator to the tomography inversion target function using the following formula:

$$LFu=\Delta\tau \quad (4),$$

wherein L is a tomography inversion linearized operator, F is the fault control beam tomography operator, and u is a preconditioned solution.

4. The method according to claim 1, further comprises:

solving the tomography inversion target function subject to the regularization constraint to obtain a velocity around a fault.

5. The method according to claim 4, wherein the acquiring step comprises: acquiring the seismic imaging data volume according to the velocity around the fault.

6. The method according to claim 4, wherein a solving step comprises:

solving the tomography inversion target function subject to the regularization constraint by using a preconditioned conjugate gradient method to obtain the velocity around the fault.

7. The method according to claim 1, wherein the input ray density is obtained by ray tracing.

8. A computer device, comprising a memory on which a computer program is stored and a processor, wherein the processor, when executing the computer program, implements the method according to claim 1.

9. A non-transitory computer readable storage medium, on which a computer program is stored, wherein when the computer program is executed by a processor, the method according to claim 1 is implemented.

* * * * *